US008728560B2

(12) United States Patent
Boursier et al.

(10) Patent No.: US 8,728,560 B2
(45) Date of Patent: May 20, 2014

(54) TEXTURED PEA PROTEINS

(75) Inventors: Bernard Boursier, Violaines (FR); Marie Delebarre, La Couture (FR); José Lis, La Gorgue (FR); Philippe Marquilly, Ennetieres en Weppes (FR)

(73) Assignee: Roquette Freres, Lestrem (FR)

( * ) Notice: Subject to any disclaimer, the term of this patent is extended or adjusted under 35 U.S.C. 154(b) by 1445 days.

(21) Appl. No.: 11/997,927

(22) PCT Filed: Jul. 25, 2006

(86) PCT No.: PCT/FR2006/001815
§ 371 (c)(1),
(2), (4) Date: Feb. 5, 2008

(87) PCT Pub. No.: WO2007/017571
PCT Pub. Date: Feb. 15, 2007

(65) Prior Publication Data
US 2008/0226811 A1    Sep. 18, 2008

(30) Foreign Application Priority Data

Aug. 5, 2005 (FR) ...................................... 05 08397

(51) Int. Cl.
A23J 1/00 (2006.01)
(52) U.S. Cl.
USPC .......................................... 426/656; 426/622
(58) Field of Classification Search
USPC ....................................................... 426/656
See application file for complete search history.

(56) References Cited

U.S. PATENT DOCUMENTS

| | | |
|---|---|---|
| 4,169,090 A | 9/1979 | Murray et al. |
| 4,435,438 A | 3/1984 | Lehnhardt et al. |
| 4,766,204 A | 8/1988 | Nickel et al. |
| 5,270,450 A * | 12/1993 | Westfall et al. ............... 530/378 |
| 5,972,119 A | 10/1999 | Krikken et al. |
| 2004/0091600 A1 | 5/2004 | Salome et al. |

FOREIGN PATENT DOCUMENTS

| | | |
|---|---|---|
| DE | 19643961 | 5/1997 |
| FR | 2340054 | 9/1977 |
| FR | 2827123 | 1/2003 |
| WO | WO 2004/110162 | * 12/2004 |
| WO | WO 2004110162 | 12/2004 |

OTHER PUBLICATIONS

Kearns et al. In "Proceedings of the World Congress on Vegetable Protein Utlization in Human Foods and Animal Feedstuffs" Ed. Applewhite, T.H., 1998, p. 534.*
Sumner et al. "Production and Evaluation of Pea Protein Isolate" J. Food Sci. vol. 46 (1981) p. 364-366.*
Wang N et al., "Extrusion texturization of air-classified pea protein", 1999, pp. 509-513.

* cited by examiner

*Primary Examiner* — Elizabeth Gwartney
(74) *Attorney, Agent, or Firm* — Young & Thompson

(57) ABSTRACT

The invention relates to granulated pea protein composition characterized in that the protein content expressed in terms of a dry substance ranges from 70 to 95% by dry weight, preferably from 70 to 90% by dry weight, more preferably from 80 to 85% by dry weight, a mean diameter ranges from 150 to 300 μm, a compressibility value determined by the HOSOKAWA method ranges from 5 to 15%, preferably from 8 to 13% and a tamped density determined by the HOSOKAWA method ranges from 0.450 and 0.650 g/ml, preferably from 0.550 and 0.650 g/ml. The method for producing said granulated pea protein composition, the use thereof in the form of a raw material for producing textured pea proteins and the thus obtainable textured pea proteins are also disclosed.

19 Claims, No Drawings

TEXTURED PEA PROTEINS

The present invention relates to a granulated pea protein composition characterized by its richness in proteins, its particle size and its compressibility value. Said composition is also characterized by its tamped density.

The present invention relates more particularly to the use of said granulated pea protein composition for the production of textured pea proteins intended for food applications, both for humans and for animals.

Finally, the present invention relates to the textured pea proteins thus obtained, and also to the method for producing them.

The protein texturing technique, in particular by "wet spinning", for the purpose of preparing products with a fiber structure intended for the production of meat and fish analogues, has been applied to numerous plant sources.

Historically, the first proteins used as meat analogues were extracted from soybean and from wheat. Soybean then rapidly became the main source for this field of application.

While most of the studies that followed naturally related to soybean proteins, other sources of both animal and plant proteins were textured: proteins from peanut, sesame, cottonseeds, sunflower, maize, wheat, proteins derived from microorganisms, from abattoir by-products or from the fish industry.

Proteins from leguminous plants, such as those derived from pea and from horse bean have also been the subject of studies, both in the field of their isolation and in that of their texturing.

Numerous studies have been undertaken on pea proteins, given their specific functional and nutritive properties, but also for their nongenetically modified nature.

Despite the efforts of considerable research, the penetration of these pea protein based products onto the food market has remained very limited. Their high cost restricts them to specific markets of limited size, such as that of dietetic products.

According to the authors of the review article in *Sciences des aliments* [Food sciences], (J. Culioli and P. Sale, vol 5 (1985), pp 177-196), one of the causes of this relative failure lies in the fact that the primary spinning methods are complex and expensive methods, and that the fibers obtained do not have very satisfactory organoleptic characteristics.

Thus, these methods use an elaborate raw material (protein isolate) and comprise many steps that are expensive in terms of both labor and chemical products.

The major difficulty conventionally encountered in texturing a pea protein composition is that the latter must be more than 50% rich in proteins in order to be textured.

Pea protein isolates, which have a total protein content of from 90% to 95%, are therefore more particularly chosen for this field of application.

Furthermore, the mechanical properties and also the ability to retain water of the fibers obtained are often far removed from the characteristics desired for imitating conventional fibrous products such as meat and fish.

A certain number of methods have been proposed in order to remedy this drawback; methods which are aimed at texturing the proteins alone via techniques other than wet spinning, such as dry or semi-melt spinning, or the texturing of pea proteins as a mixture with other proteins or polysaccharides.

One of the first methods for texturing proteins alone by the semi-melt process that was developed consisted in redissolving precipitated proteins and in passing them through a die to a precipitation bath.

The resulting fibrous material is then reworked by compacting, coating and cooking.

This method requires an expensive starting material, protein isolates, and requires a considerable initial investment in terms of compacting, coating and cooking equipment.

The most promising method remains that of the cooking-extrusion of proteins, which consists in continuously cooking conditioned protein material, so as to process a "plastic" mass through heating, pressure and mechanical shear steps (cf. the review by Laurie Keeler of September 2004 published on www.Preparedfoods.com).

In addition to its texturing capacity, the extrusion-cooking method provides the proteins with important properties, such as a reduction in their solubility, an increase in their digestibility, thermal deactivation of temperature-sensitive growth inhibitors, partial drying of said proteins and, generally, a reduction in their microbial load.

However, a certain number of limiting factors impair the texturing of pea proteins, such as, in particular, their fat content. Too high a proportion in the protein fraction to be extruded in fact requires a greater shear effect (and therefore more energy) in order to obtain an industrially acceptable result.

It is conventionally accepted that a fat content of more than 3% interferes with the texturing process during the extrusion. For example, only the use of additional thermal energy and mechanical energy can make it possible to obtain an acceptable product when the fat content is of the order of 6 to 7%. Beyond this, the quality of the textured products drops very rapidly.

Another technical solution selected consisted in texturing the pea proteins with polysaccharides, such as starch (cf. article by Alonso et al., in *Journal of the Science of Food and Agriculture,* 80 (2000), 397-403).

This involves "diluting" the proteins of the pea isolates with starch, preferably a pea starch, which allows a substantial gain in raw materials.

This solution is described as making it possible both:
  to reduce the costs by incorporating slightly fewer proteins, and thus texturing raw materials less elaborate than protein isolates, and
  to compensate for the mediocre water-retention properties normally observed for the fibers obtained from protein isolates alone, through the addition of an ingredient, in this case starch.

In addition, starch has advantageous functional properties which should make it possible to substantially improve the characteristics of the fibers, in particular their water content.

However, the presence of starch proportions that are too great, just like that of fat proportions that are too great with the proteins to be textured, results in blocking of the interactions or the bridging of the protein molecules with one another, which interactions are nevertheless necessary for obtaining good texturing properties for mimicking meat-type products.

Moreover, this starch is present in grains in insoluble form; the granules, which reach sizes up to 40 μm, can modify the rheological characteristics of the pea proteins, and therefore the conditions under which they will be textured.

Finally, while the incorporation of starch into plant protein fibers makes it possible to improve the texture of the extruded products by increasing their ability to retain water and a moderate decrease in their mechanical resistance, this effect is especially marked only after gelatinization of the starch grains.

However, the swelling of the starch grains during gelatinization causes a very substantial increase in the consistency of the material to be extruded, which makes the extrusion operations very tricky. It is even recommended to carry out the extrusion at pHs of below 12.5 with unmodified starch grains and to perform the gelatinization only on the finished product after incorporation of a binder.

Moreover, it is necessary to incorporate starch at between 10% and 30% in order to obtain the expected mechanical strength properties.

Another technical solution consisted in carrying out the extrusion of the pea proteins as a mixture with other proteins, such as wheat proteins (cf. the article by Lucas in *Food Trade Review*, 66-9 (1996), 53), which makes it possible to reduce the fat content and to increase the total protein content of the plant material to be extruded.

It appears that the extrusion of pea proteins alone is barely effective for obtaining acceptable textured products, and that the technical solutions are rather the cutting thereof with polysaccharides (such as starch) or other proteins.

However, it is accepted that the quality of the pea protein compositions, and therefore the quality of the resulting textured pea proteins, is directly dependent on the operating conditions used to prepare them.

Thus, Wang et al., in *Journal of Food Science*, 64-3 (1999), 509-513, proposed to study the influence of the extrusion conditions on the functional and nutritional properties of textured pea proteins, which pea proteins were prepared by means of the "air classification" dry extraction process.

These authors conclude that the texturing of said proteins obtained by air classification is entirely possible, and produces products having functional properties equivalent to textured soybean proteins.

However, it is necessary to finely adjust the extrusion conditions in order to achieve this. The degree of moisture, the extrusion rate and the temperature affect said functional properties of the textured proteins; an increase in the moisture content induces an increase in the density of the products obtained and the bioavailability of lysine, but decreases its ability to retain water. Conversely, an increase in the rate of extrusion has the reverse effect.

The temperature has a direct effect on the density and the bioavailability of lysine of the textured products in an inversely proportional manner.

From all the above, it follows that there exists an unmet need to have a composition of pea proteins with a high protein content, the quality and the structural characteristics of which will make it possible for them to be both readily textured, without it being necessary to exercise too restrictive a control on the conditions for carrying out the cooking-extrusion, and to produce textured products whose functional properties will mean that they can effectively be intended for use in food applications, in particular as meat analogues.

The applicant company has, to its credit, reconciled all these objectives reputed up until then to be difficult to reconcile, by proposing a granulated pea protein composition, characterized in that it has:
  a protein content expressed in terms of solids ranging from 70% to 95% by weight on a dry weight basis, preferably from 70% to 90% by weight on a dry weight basis, more preferably from 70% to 88% by weight on a dry weight basis, and even more preferably from 80% to 85% by weight on a dry weight basis;
  a mean diameter ranging from 150 to 300 µm,
  a compressibility value, determined by the Hosokawa method, ranging from 5% to 15%, preferably from 8% to 13%.

The applicant company has, to its credit, chosen this particular quality of pea proteins, the structural parameters of which are calibrated so as to optimize the subsequent operating of the extruder (extruder feed, operating temperature and pressure, screw speed), as will be explained hereinafter.

The granulated pea protein composition according to the invention has a protein content expressed in terms of solids ranging from 70% to 95% by weight on a dry weight basis, preferably from 70% to 90% by weight on a dry weight basis, more preferably from 70% to 88% by weight on a dry weight basis, and even more preferably from 80% to 85% by weight on a dry weight basis.

The applicant company has therefore gone against a technical prejudice which says that the manufacture of textured pea proteins requires the use of pea protein isolates with a high protein content (90% to 95%).

The protein content of said protein composition in accordance with the invention is determined by the method of determining nitrogen according to the Dumas method in samples in which the presumed nitrogen content is greater than 0.030% (weight/weight), according to standard NF V 18-120—March 1997.

The nitrogen content or protein content ($N \times 6.25$) is expressed in grams per 100 grams of dry product.

The granulated pea protein composition according to the invention also has a mean diameter ranging from 150 to 300 µm.

These mean diameter values are determined from the particle size distribution values of the sample under consideration.

This particle size distribution is expressed as % by weight of particles retained on Alpine vibrating screens having specific meshes, the screen being equipped with a suction device and a manometer for verifying the operating pressure.

For this, 10 screens of mesh 800 µm, 500 µm, 315 µm, 250 µm, 200 µm, 150 µm, 100 µm, 80 µm, 63 µm, 50 µm and 40 µm are used, the weight of the fraction of particles retained on each screen is determined by weighing on a laboratory balance with a sensitivity of $\frac{1}{100}^{th}$ of a gram, and the oversize is expressed as percentage by mass of product as such.

The screening is carried out on a sample of 50 g, left on a vibrating screen for 3 minutes.

The pressure decrease is adjusted in such a way that, during the screening, the latter ranges from 3000 to 3500 Pa.

The mean diameter is then calculated by the method for determining the uniformity of a powder according to Hosokawa. The percentage of the particles that have passed through the screen is reported, on semi-logarithmic paper, as a function of the particle sizes in µm.

The mean diameter is the value of the size of the particles corresponding to 50% of particles having passed through the screen.

The granulated pea protein composition in accordance with the invention is also characterized by its flow capacity, expressed by its compressibility value according to Hosokawa.

The compressibility values of the granulated pea protein composition according to the invention are determined using the PTE Powder Tester apparatus sold by the company Hosokawa, according to the constructor's specification.

This apparatus makes it possible to measure, under standardized and reproducible conditions, the flow capacity of a powder by measuring in particular the bulk aerated density and the bulk tamped density and then calculating, from these data, the compressibility values by the following formula:

$$\text{Compressibility (\%)} = \frac{(\text{tamped denisty} - \text{aerated density})}{\text{tamped density}} \times 100$$

The compressibility value is a very important factor for finding the flow characteristics of a granulated product.

According to the method for using the Hosokawa PTE apparatus, when the compressibility value is approximately 20%, the powder does not exhibit free flow and has a tendency to form domes in the hopper. For specific compressibility values of 40-50%, it even becomes impossible to discharge the material from the hopper once the material has been stored therein.

The granulated pea protein composition in accordance with the invention having a compressibility value ranging from 5% to 15%, preferably from 8% to 13%, has an entirely suitable flow, unlike the commercially available pea protein isolates, as will be exemplified hereinafter.

The granulated pea protein composition in accordance with the invention can also be characterized by its tamped density, this measurement being carried out using the PTE Powder Tester apparatus, as mentioned above, according to the method recommended in the instructions for use of said Powder Tester (setting by default on 180 shakes).

Under these conditions, the granulated pea protein composition in accordance with the invention has a tamped density ranging from 0.450 to 0.650 g/ml, preferably ranging from 0.550 to 0.600 g/ml.

These density, flow capacity and mean diameter parameters make the granulated composition particularly suitable for the extrusion operations for which they may be intended.

To the applicant company's knowledge, no granulated pea protein composition having such structural characteristics exists in the prior art.

By way of example, the pea protein isolates sold under the trademark Pisane® HD by the company Cosucra S.A. (Momalle-Belgium) or sold under the trademark Propulse™ by the company Parrheim (Canada) have, for a tamped density equivalent to the granulated pea protein composition according to the invention, a finer particle size and a compressibility value of the order of 45%, which means they are not particularly intended for cooking-extrusion operations.

In fact, compression zones are conventionally created within the extrusion process per se. If the powder to be extruded has a high compressibility value (which is generally explained by the presence of a large amount of air trapped in the powder), pockets of high compression will be created in the conveying device, and this will greatly disturb the operation of the apparatus.

Conversely, the granulated pea protein composition in accordance with the invention has an excellent flow capacity (expressed by a low compressibility value), which makes it particularly suitable for the cooking-extrusion operation.

Moreover, these low compressibility values are desired for feeding the extruder, since the powder must be stored in a hopper and then in a volumetric metering device before being extruded.

The flow properties of the granulated pea protein in accordance with the invention make it possible to ensure a regular feed of material into the extruder.

It is important to also note that the principle of the extruder is to continuously convey a certain volume of material. Consequently, for the same screw rotation rate, the higher the density of the product to be conveyed, the greater the productivity.

The granulated pea protein in accordance with the invention has a high density, which means that it conforms entirely to these specifications.

The granulated pea protein composition is also characterized by its residual moisture content, and its extractable fat content.

The moisture content is determined by thermogravimetry on the TG 50 apparatus sold by the company Mettler Toledo.

Exactly 20 mg of sample are placed in the aluminum oxide crucible of the apparatus. The sample is heated from 25 to 160° C. at the rate of 10° C./min in an oven, swept with an inert gas at a flow rate of 20 ml/min. The variation in weight of the sample is recorded over time.

Exploitation of the weight loss curve (determination of the slope of the curve as a function of the temperature via the data-processing software provided by the constructor of the apparatus) gives the water content of the sample, expressed as % by weight.

The granulated pea protein composition thus has a residual moisture content ranging from 8% to 12% by weight.

Finally, the granulated pea protein composition is characterized by its extractable fat content, ranging from 0.5% to 5% by weight on a dry weight basis, preferably ranging from 0.5% to 3% by weight on a dry weight basis, more preferably ranging from 0.5% to 1.5% by weight on a dry weight basis.

This test for measuring the extractable fat content consists in determining the extractable lipid content according to process A of the $2^{nd}$ EEC guideline amended by that of Dec. 20, 1983, published in the ECOJ of Jan. 18, 1984,—reiterated in NF V18-117 of August 1997 "category A samples".

The principle of this method is based on hexane extraction of the lipids of a sample of 25 g in a Soxhlet extractor (the reflux flow rate should be set so as to obtain 10 cycles per hour), elimination of the solvent and weighing of the residue thus obtained.

The extractable lipid content is expressed as percentage by weight of the residue relative to the 25 g of sample analyzed.

The granulated pea protein composition according to the invention then has an extractable fat content ranging from 0.5% to 5% by weight on a dry weight basis, preferably ranging from 0.5% to 3% by weight on a dry weight basis, more preferably ranging from 0.5% to 1.5% by weight on a dry weight basis.

The low moisture content, and this low extractable fat content, contribute to making the granulated pea protein composition in accordance with the invention particularly suitable for the cooking-extrusion operations for which it is intended.

The granulated pea protein composition in accordance with the invention can be obtained by carrying out the following steps.

The extraction of the pea flour components can be carried out by any means, and in particular according to the method described in patent application EP 1 400 537, of which the applicant company is the proprietor.

More particularly, this method consists of the succession of the following steps:
- preparing a flour by grinding dry peas previously cleaned, sorted, blanched and dusted,
- suspending the pea flour in water,
- fractionating said suspension so as to isolate a protein-rich fraction,
- isolating the protein component of said fraction by a thermal flocculation technique at the isoelectric pH of said proteins and at a temperature ranging from 40 to 70° C. for from 10 to 30 minutes, centrifuging the precipitated mixture using a centrifugal decanter or a plate separator so as to recover the soluble proteins in the precipitate, diluting the precipitate in water so as to obtain a solids content ranging from 15% to 25%, correcting the pH of the solution to a value ranging from 7 to 7.5, optionally, thermally treating said precipitate resuspended in water at a temperature ranging from 75 to 95° C. for from 10 minutes to 1 hour, granulating and drying said solution in a spray tower, recovering the granulated pea protein composition thus obtained.

In a first step of the method in accordance with the invention, the flour obtained from peas previously cleaned, sorted, blanched, dusted and ground is suspended in water.

The pH of the solution is not a limiting factor, but it is chosen not to correct the pH of the suspension, which means carrying out the process in a pH range of from 6.2 to 7.

Advantageously, the applicant company recommends placing the flour in water at a temperature ranging from 5 to 20° C., preferably of the order of 15° C., preferentially at a temperature of 10° C., cooled so as to limit the development of unwanted bacteria.

Although it is not essential, it may be chosen to leave the suspension to diffuse in this aqueous medium for a short period of time of from 5 min to 2 hours, at this temperature of from 5 to 20° C., preferably of the order of 15° C., preferentially at a temperature of 10° C., preferentially at ambient temperature.

In a second step of the method in accordance with the invention, it is chosen to fractionate said flour-in-water suspension using equipment chosen from the group consisting of hydrocylones and centrifugal decanters, so as to isolate a fraction rich in proteins and in soluble materials.

In a first preferred embodiment of this second step, the fractionation of the flour-in-water suspension consists in fractionating said suspension on centrifugal decanters, so as to isolate a fraction rich in proteins and soluble materials from a fraction consisting of the mixture of starch and internal fibers.

In a second preferred embodiment of this second step, the fractionation of the flour-in-water suspension consists in fractionating said suspension on hydrocyclones, so as to isolate a fraction rich in starch from a fraction consisting of the mixture of proteins, internal fibers and soluble materials, and then in treating the fraction consisting of the mixture of proteins, internal fibers and soluble materials on centrifugal decanters so as to separate a fraction rich in internal fibers from a fraction rich in proteins and soluble materials.

In a third step of the method in accordance with the invention, the proteins of the fraction containing the mixture of proteins and soluble materials thus obtained (whether via the first or the second preferred embodiment) are isolated by a technique chosen from the group of techniques for precipitating proteins at their isoelectric pH and ultrafiltration-type membrane separation techniques.

It is advantageously chosen to carry out the thermal flocculation of the proteins by adjusting the protein-rich fraction to a pH value corresponding to the isoelectric point (pI) of said proteins, i.e. to a pH value of the order of 4.5.

The flocculation of said proteins is then carried out at a temperature ranging from 40 to 70° C. for from 10 to 30 minutes.

This flocculation time/temperature diagram thus makes it possible to obtain a protein recovery yield ranging from 65% to 85% of extracted proteins/total proteins.

The separation of the precipitate (also referred to as "floc") containing the soluble proteins is carried out on a centrifugal decanter or on a plate separator.

The supernatant is then directed to evaporation plants so as to concentrate it to a solids content of from 30% to 35%.

The floc is then diluted to a solids content ranging from 15% to 25% so as to allow it to be conveyed to the spray plants in order to be granulated, dried and conditioned.

The pH of this diluted solution is then corrected to a pH ranging from 7 to 7.5.

This spraying is carried out under specific conditions so as to granulate said pea proteins.

An MSD spray tower with an evaporation capacity of 7000 kg/h is selected.

The drying air enters at a temperature ranging from 200 to 250° C. and exits again at a temperature ranging from 70 to 90° C., the static bed at the bottom of the tower being heated by air ranging from 80 to 90° C.

At the outlet of the spray tower, the product passes over a vibrated fluid bed where it is cooled to ambient temperature.

The fines can advantageously be recycled directly at the top of the tower.

An additional heat treatment can be carried out after the thermal flocculation step and before the spray granulation step, said treatment being carried out at a temperature of from 75 to 95° C. for from 10 minutes to 1 hour.

This additional heat treatment and then spray granulation treatment makes it possible to obtain a granulated pea protein composition in accordance with the invention.

The pea protein composition in accordance with the invention can advantageously be used, due to the quality of its structural parameters, for the manufacture of textured pea proteins.

More particularly, the textured pea proteins are characterized in that they have:
 a water uptake ranging from 5 to 6 g/g,
 a density ranging from 80 to 90 g/l, preferably ranging from 85 to 90 g/l.

The water uptake of the textured proteins of the invention is measured according to a test developed by the applicant company.

The test consists in introducing 20.0 g of the sample of textured pea proteins to be analyzed, with stirring, into 380.0 g of drinking water at 100° C. (magnetic stirring using a magnetic bar at 200 rpm).

The textured pea proteins are then left to hydrate for 10 minutes at ambient temperature.

The sample is then recovered on a pre-tared metal screen of 2000 µm, and then drained for 5 minutes.

The water uptake measurement (g/g) is then calculated by the ratio of the (weight of the rehydrated sample—weight of the dry sample) to the weight of the sample used.

The weight is determined on a laboratory balance with a sensitivity of 0.1 g.

The textured pea proteins of the invention therefore have a water uptake ranging from 5 to 6 g/g.

The density of the textured proteins of the invention is then measured.

The measurement consists first of all in grinding and screening a sample of textured pea proteins so as to recover the fraction having a size ranging from 2000 to 8000 µm.

The grinding is carried out on a "Robot Coupe" R4 on speed 1 for 30 seconds, and the screening is carried out on a "Retsch" screening-vibrating device equipped with two screens of 2000 and 8000 µm.

The density (g/l) is then calculated by the measurement of the (weight of textured proteins required to fill a graduated cylinder to its 250 ml gauge line) multiplied by 4.

The textured pea proteins in accordance with the invention then have a density ranging from 80 to 90 g/l, preferably ranging from 85 to 90 g/l.

As will be presented hereinafter, the textured proteins in accordance with the invention exhibit a behavior equivalent to or even better than that of the textured pea proteins that can be obtained from the commercial pea protein isolates, or even that of the commercial textured soybean proteins, taken here as reference, for products having a much lower density.

To the applicant company's knowledge, no textured pea proteins having such functional properties exist in the prior art.

The textured pea proteins also have a structure consisting of well-oriented long fibers, and a color index having a value ranging from 75 to 95, preferably ranging from 79 to 81 in the balance of whites, ranging from 1 to 5, preferably ranging from 2.5 to 3.5 in the balance of reds, and ranging from 10 to 30, preferably ranging from 23 to 27 in the balance of yellows.

The determination of the structure of the textured pea proteins in accordance with the invention consists in evaluating, by sensory analysis, the fibrous state of the proteins obtained.

A jury of 10 individuals is formed, each having to state their opinion as to the "fibrous" or "agglomerated" nature of the textured products with which they are presented. The summary of the evaluations obtained for each sample makes it possible to compare them with one another, according to the following notation:

notation "−": no fibrous structure, agglomerated appearance,
notation "+": agglomerated structure with, however, the presence of short fibers,
notation "++": fibrous structure with short fibers,
notation "+++": pronounced fibrous structure, with long and well-oriented fibers.

The textured pea proteins are thus classified "+++", i.e. thus having a pronounced fibrous appearance, without an agglomerated zone.

The calorimetric test consists in determining, by means of a Minolta CR 200 chromometer, the mean of the balance of whites (L), of reds (a) and of yellows (b) of a ground and screened textured pea protein sample.

The grinding and screening conditions are identical to those used for the measurement of the density of the textured proteins, presented above, but the fraction of size less than 2000 μm is recovered in this case.

This ground powder is then placed in a transparent Petri dish 90 mm in diameter.

The color of the sample is measured, through the Petri dish, by reflection, using the chromometer, according to the constructor's specifications.

The measurement is carried out in triplicate, and expressed in terms "L", for the coefficient of brightness (dark (0) to bright (+)), "a" for the coefficient of green (−) to red (+) and "b" for the coefficient of blue (−) to yellow (+).

The textured pea proteins have an entirely acceptable fibrous structure, in accordance with the best fibrous structures of textured soybean proteins, and an equivalent or even better calorimetric appearance.

Finally, the textured pea proteins are characterized by their residual moisture content ranging from 10% to 15%, preferably ranging from 12% to 14%.

The measurement of the residual moisture content consists in exactly weighing 2.0 g of test sample and measuring the water content thereof on a Sartorius MA 40 infrared balance at 135° C., according to the constructor's specifications.

The residual moisture content is calculated by the following formula:

$$H(\%) = \frac{2.0 - P_{ef}}{2.0}$$

Where $P_{ef}$ corresponds to the weight of the sample after automatic arrest of the weighing, which occurs when the apparatus no longer measures any fluctuation in weight.

The textured pea proteins in accordance with the invention can be prepared by cooking-extrusion of the granulated pea protein composition defined above.

The cooking-extrusion is carried out by the succession of the following steps:

adding 0.4% by weight of sodium metasulfite and 2% by weight of gypsum to the granulated pea protein composition as claimed in either of claims 1 and 2,
introducing the mixture thus obtained with water into a cooking-extruding device having a co-rotating twin-screw configuration, preferably with 5 barrels,
carrying out the extrusion at a first-boiler temperature ranging from 80 to 90° C., and a second-boiler temperature ranging from 150 to 190° C., and a screw speed ranging from 450 to 500 rpm,
recovering the textured pea proteins at the extruder outlet in the form of a strip.

The pea protein composition is first of all conditioned before the cooking-extrusion operation, by adding 0.4% of sodium metalsulfite and 2% of gypsum to a Hobart mixer containing 97.6% of pea proteins.

The applicant company has found that sodium metasulfite, at 0.4% by weight/weight, advantageously makes it possible to reduce the extemporaneous formation of disulfide bridges in the proteins during the cooking-extrusion process, and facilitates the formation of the fibrous and aerated structures of the textured proteins obtained, and that gypsum at 2% by weight/weight makes it possible to strengthen their structure.

The cooking-extruding device may, for its part, have a co-rotating twin-screw configuration, preferably with 5 barrels.

In this configuration, barrel 1 corresponds to the zone for feeding/blending the powder of proteins in the extruder, which zone also has a water feed realized under barrel No. 1. Barrels No. 2 and No. 3 correspond to the conveying zone (supply of thermal energy); barrel No. 4 corresponds to the melt zone (supply of mechanical energy—counterflights—and thermal energy), and zone 5 is for conveying and forming (expulsion via the die).

The first die is 3 mm in diameter, and the second is closed off.

The thermal configuration of the cooking-extruding device is the following:

barrels 1 and 5 not heated,
barrels 2 and 3 heated by a first oil boiler at 90° C., in order to supply the necessary thermal energy,
barrel 4 heated by a second oil boiler at 190° C. (supply of mechanical energy by substantial shear—double set of counterflights—and additional supply of thermal energy).

The powder feed is carried out by means of a volumetric metering device, for example Dosapro Milton Roy, and the drinking water feed under barrel No. 1 is carried out by means of a pump, for example of Ismatec MV type.

After expulsion from the die, the textured pea proteins are recovered in the form of a strip and dried at ambient temperature.

The textured pea proteins in accordance with the invention can be advantageously used in food applications, in products of the meat, fish, ready meals type as "extenders"; and also in vegetarian products and snacks as a texturing agent.

Other characteristics and advantages of the invention will emerge on reading the nonlimiting examples described below.

EXAMPLE 1

Pea flour is prepared by grinding shelled fodder peas in an Alpine hammer mill equipped with a 100 μm screen. 300 kg of flour containing 87% of solids are then soaked in water at the final concentration of 25% on a dry weight basis, at a pH of 6.5.

1044 kg of flour suspension containing 25% of solids (i.e., therefore, 261 kg of dry flour) are then introduced with 500 kg of water into a battery of hydrocyclones composed of 14 stages. It is fed with the flour suspension at stage No. 5.

This separation results in the production of a light phase which corresponds to the outlet of stage No. 1. It consists of the mixture of proteins, internal fibers and soluble materials.

This light phase at the hydrocyclone outlet contains as a mixture (142 kg on a dry weight basis in total): the fibers (approximately 14.8% by weight, i.e. 21 kg on a dry weight basis), the proteins (approximately 42.8% by weight, i.e. 60.8 kg on a dry weight basis) and soluble materials (approximately 42.4% by weight, i.e. 60.2 kg on a dry weight basis). This fraction has a solids content of 10%.

The fiber separation is carried out on Wesphalia centrifugal decanters used in an industrial potato-processing starch unit.

The light phase at the centrifugal decanter outlet contains a mixture of proteins and soluble materials, whereas the heavy phase contains the pea fibers. The heavy phase contains 105 kg of fibers containing 20% of solids. It is noted that virtually all the fibers are indeed found in this fraction.

As for the protein and soluble material fraction, it contains 1142 kg of a mixture in solution of soluble materials and proteins (fraction containing 6% of solids).

The flocculation of the proteins is carried out at their isoelectric point by adjusting the light phase at the centrifugal decanter outlet to a pH of 4.5 and heating to 60° C. by passing through a nozzle.

The proteins thus flocculated are left for 10 minutes in a maturing tank. The soluble materials/proteins are then separated on a centrifugal decanter.

The mixture obtained at the outlet of the maturing tank then feeds the centrifugal decanter at a flow rate of 5 m³/h. The heavy phase, or "floc", which has a solids content of 35%, is diluted to 18% by adding water. The floc pH of 4.5 is corrected to a value of 7.5 by adding sodium hydroxide.

A heat treatment at 85° C. for 10 minutes is then carried out on the floc thus obtained, on a heat exchanger with a rough surface. Finally, spraying is carried out on an MSD (Multi Stage Dryer) tower under the following conditions.

An MSD spray tower with an evaporation capacity of 4000 kg/h is selected and is fed with the granulated pea protein composition in accordance with the invention at a rate of 2000 kg/h. The drying air enters at 180° C. and exits again at 80° C., the static bed at the bottom of the tower being heated by the air at 80° C.

At the outlet of the spray tower, the product passes over a vibrated fluid bed where it is cooled to ambient temperature. The fines can advantageously be directly recycled at the top of the tower.

All these operations make it possible to obtain a granulated pea protein composition in accordance with the invention having the characteristics given in table I below.

TABLE I

|  | Granulated pea protein composition obtained |
|---|---|
| Total protein content (% N × 6.25 on a dry weight basis) | 84 |
| Particle size distribution % of particles of size >: | |
| 800 μm | 0 |
| 500 μm | 0.1 |
| 315 μm | 0.8 |
| 250 μm | 56.6 |
| 200 μm | 79.6 |
| 150 μm | 84.8 |
| 100 μm | 92 |
| 80 μm | 93.6 |
| 63 μm | 95.4 |
| 50 μm | 95.6 |
| 40 μm | 96.8 |
| % of particles < | |
| 40 μm | 3.2 |
| Mean diameter (μm) | 260 |
| Compressibility value (%) | 8.1 |
| Tamped density (g/ml) | 0.555 |
| Residual moisture content (%) | 8.4 |
| Extractable fat content (%) | 0.5 |

EXAMPLE 2

The granulated protein composition in accordance with the invention, prepared by applying the method described in example 1, is compared, in table II below, with commercial protein isolates sold by the companies Cosucra and Parrheim.

TABLE II

|  | Pisane ® HD Cosucra | Propulse ™ Parrheim | Granulated pea protein composition in accordance with the invention |
|---|---|---|---|
| Total protein content (% N × 6.25 on a dry weight basis) | 88.4 | 84.5 | 84 |
| Particle size distribution % of particles of size >: | | | |
| 800 μm | 0 | 0 | 0 |
| 500 μm | 0 | 0 | 0.1 |
| 315 μm | 0.1 | 0 | 0.8 |
| 250 μm | 0.3 | 0 | 56.6 |
| 200 μm | 1 | 0 | 79.6 |
| 150 μm | 1.4 | 0.1 | 84.8 |
| 100 μm | 7.3 | 2.4 | 92 |
| 80 μm | 13.8 | 7.6 | 93.6 |
| 63 μm | 34.2 | 28 | 95.4 |
| 50 μm | 42.1 | 37.8 | 95.6 |
| 40 μm | 61.4 | 59.4 | 96.8 |
| % of particles < | | | |
| 40 μm | 38.6 | 40.6 | 3.2 |
| Mean diameter (μm) | 45 | 44 | 260 |
| Compressibility value | 45.05 | 45.95 | 8.1 |

TABLE II-continued

|  | Pisane ® HD Cosucra | Propulse ™ Parrheim | Granulated pea protein composition in accordance with the invention |
|---|---|---|---|
| (%) Tamped density (g/ml) | 0.455 | 0.555 | 0.555 |
| Residual moisture content (%) | 10.2 | 9.7 | 8.4 |
| Extractable fat content (% on a dry weight basis) | 1.2 | 1.9 | 0.5 |

The granulated pea protein composition in accordance with the invention has a better flow capacity (compressibility value below the threshold of 20%), a higher particle size and a much lower extractable fat content than the commercially available pea protein isolates.

These particular properties mean that they are much more suitable as raw materials for the manufacture of textured pea proteins.

EXAMPLE 3

Two batches of textured pea proteins are prepared by cooking-extraction of the pea protein composition of example 1, and the same batches of Pisane® HD and of Propulse™ as those also described in example 1 are used as controls.

The four series of parameters of the cooking-extrusion operation, carried out on a Bühler DNDL 44 co-rotating twin-screw cooking device with 5 barrels are presented in table III below.

TABLE III

|  | Pisane ® HD Cosucra | Propulse ™ Parrheim | Batch 1 | Batch 2 |
|---|---|---|---|---|
| Metering device mark | 8 | 8 | 8 | 8 |
| Mixture flow rate (kg/h) | 28.23 | 24.9 | 22.40 | 22.40 |
| Pump mark | 290 | 250 | 350 | 400 |
| Water flow rate (l/h) | 2.45 | 2.09 | 5.20 | 5.90 |
| Screw speed (rpm) | 365.7 | 366 | 475 | 475 |
| Pressure (bar) | 52 | 70-100 | 43 | 35 |
| Tp boiler No. 1 (° C.) | 80 | 80 | 80 | 90 |
| Tp boiler No. 2 (° C.) | 150 | 150 | 150 | 190 |
| Tp outlet (° C.) | 163 | 175-180 | 177 | 173 |

Once dried at ambient temperature, the products have all the functional properties given in table IV below.

TABLE IV

|  | Pisare ® HD Cosucra | Propulse ™ Parrheim | Batch 1 | Batch 2 |
|---|---|---|---|---|
| Total protein content (% N × 6.25) | 92 | 92.2 | 81.2 | 79.2 |
| Water uptake (g/g) | 6 | 4.4 | 5.3 | 5.4 |
| Density (g/l) | 171.2 | 72 | 87 | 87.7 |
| Fibrous texture | +++ | + | +++ | +++ |
| Coloration |  |  |  |  |
| L: balance of whites | 82.61 | 100.58 | 80.59 | 79.22 |
| a: balance of reds | +0.71 | +0.12 | +2.68 | +3.36 |
| b: balance of yellows | +24.94 | +1.89 | +23.89 | +25.97 |
| Sartorius moisture content (%) | 13.28 | 11.69 | 12.08 | 13.77 |

The textured pea proteins (batches 1 and 2), obtained by cooking-extrusion of the granulated pea protein composition in accordance with the invention of example 1, are of a very high quality, much higher than those obtained from the Propulse™ pea protein isolate.

The textured pea proteins (batches 1 and 2) have a large water capacity, for a density greater than those prepared from the Propulse™ and significantly lower than those prepared from the Pisane® HD.

The structure of the textured pea proteins (batches 1 and 2) is well oriented, with a well-formed fibrous aspect.

The color of the textured pea proteins (batches 1 and 2) is entirely satisfactory.

Table V below gives the result of a comparative study carried out between the textured pea proteins in accordance with the invention compared to the commercially available wheat and soybean textured proteins.

TABLE V

| Trade name | WHEATPRO | RESPONSE SOY 4410 | DANPROTEX B 50 TS | PTB 60 | TEXTURATEIN |  |
|---|---|---|---|---|---|---|
| Manufacturer | FPS | Rector Foods Limited | FPS | Sotexpro | Cargill | Textured pea proteins in accordance with the invention |
| Botanical origin | Wheat | Soybean | Soybean | Wheat | Soybean | Pea |
| Water uptake (g/g) | 4 | 3.4 | 6.5 | 6.8 | 6.5 | 5-6 |
| Density (g/l) | 139.6 | 292.4 | 237.6 | 129.2 | 649.2 | 80-90 |
| Coloration |  |  |  |  |  |  |
| L: balance of whites | 91.09 | 69.71 | 75.09 | 79.13 | 75.25 | 79-81 |
| a: balance of reds | +2.19 | +3.37 | +2.50 | +2.72 | +5.24 | 2.5-3.5 |
| b: balance of yellows | +15.91 | +20.11 | +18.32 | +17.21 | +20.56 | 23-27 |
| Sartorius moisture content (%) | 10.4 | 8.4 | 10.6 | 9.3 | 10.4 | 10-15 |

The textured pea proteins obtained according to the invention have properties similar to the textured proteins prepared from soybean, and superior to the textured pea proteins prepared from wheat, namely good water retention, a low density and a well-oriented fibrous structure.

The invention claimed is:

1. A granulated pea protein composition, having:
    a protein content expressed in terms of solids ranging from 70% to 95% by weight on a dry weight basis,
    a mean diameter ranging from 150 to 300 μm, and
    a compressibility value, determined by the Hosokawa method, ranging from 5% to 15%.

2. The granulated pea protein composition as claimed in claim 1, having a tamped density, determined according to the Hosokawa method, ranging from 0.450 to 0.650 g/ml.

3. The granulated pea protein composition as claimed in claim 1, having:
    a residual moisture content ranging from 8% to 12%,
    an extractable fat content ranging from 0.5% to 5% by weight on a dry weight basis.

4. The granulated pea protein composition as claimed in claim 1, wherein the protein content, expressed in terms of solids, ranges from 70% to 85% by weight on a dry weight basis.

5. The composition as claimed in claim 2, having:
    a residual moisture content ranging from 8% to 12%,
    an extractable fat content ranging from 0.5% to 5% by weight on a dry weight basis.

6. A granulated pea protein composition, having:
    a protein content expressed in terms of solids ranging from 70% to 95% by weight on a dry weight basis,
    a residual moisture content ranging from 8% to 12%,
    an extractable fat content ranging from 0.5% to 5% by weight on a dry weight basis,
    a mean diameter ranging from 150 to 300 μm, and
    a compressibility value, determined by the Hosokawa method, ranging from 5% to 15%, and
    a tamped density, determined according to the Hosokawa method, ranging from 0.450 to 0.650 g/ml.

7. The granulated pea protein composition as claimed in as claimed in claim 6, wherein the protein content, expressed in terms of solids, ranges from 70% to 85% by weight on a dry weight basis.

8. A method for manufacturing the composition as claimed in claim 1, comprising the succession of the following steps:
    preparing a flour by grinding dry peas previously cleaned, sorted, blanched and dusted,
    suspending the pea flour in water,
    fractionating said suspension so as to isolate a fraction rich in proteins and in soluble materials,
    isolating the protein component of said fraction rich in proteins and in soluble materials by a thermal flocculation technique at the isoelectric pH of said proteins and at a temperature ranging from 40 to 70° C. for from 10 to 30 minutes,
    centrifuging the precipitated mixture using a centrifugal decanter or a plate separator so as to recover the soluble proteins in the precipitate,
    diluting the precipitate in water so as to obtain a solids content ranging from 15% to 25%,
    correcting the pH of the solution to a value ranging from 7 to 7.5,
    optionally, thermally treating said precipitate resuspended in water at a temperature ranging from 75 to 95° C. for from 10 minutes to 1 hour,
    granulating and drying said solution in a spray drying tower, and
    recovering the granulated pea protein composition thus obtained.

9. The method as claimed in claim 8, wherein the fraction rich in proteins and soluble materials is obtained by means of the steps consisting in:
    fractionating the flour-in-water suspension on centrifugal decanters, so as to isolate a fraction rich in proteins and soluble materials from a fraction consisting of the mixture of starch and internal fibers,
    recovering the fraction rich in proteins and soluble materials in the supernatant of the centrifugal decanters.

10. The method as claimed in claim 8, wherein the fraction rich in proteins and soluble materials is obtained by means of the steps consisting in:
    fractionating the flour-in-water suspension on hydrocyclones, so as to isolate a fraction rich in starch from a fraction consisting of the mixture of proteins, internal fibers and soluble materials,
    treating the fraction consisting of the mixture of proteins, internal fibers and soluble materials on centrifugal decanters so as to separate a fraction rich in internal fibers from a fraction rich in proteins and soluble materials, and
    recovering the fraction rich in proteins and soluble materials in the supernatant of the centrifugal decanters.

11. The method as claimed in claim 8, wherein the spray-drying tower is a Multi Stage Dryer (MSD) tower.

12. A method for manufacturing the composition as claimed in claim 6, comprising the succession of the following steps:
    preparing a flour by grinding dry peas previously cleaned, sorted, blanched and dusted,
    suspending the pea flour in water,
    fractionating said suspension so as to isolate a fraction rich in proteins and in soluble materials,
    isolating the protein component of said fraction rich in proteins and in soluble materials by a thermal flocculation technique at the isoelectric pH of said proteins and at a temperature ranging from 40 to 70° C. for from 10 to 30 minutes,
    centrifuging the precipitated mixture using a centrifugal decanter or a plate separator so as to recover the soluble proteins in the precipitate,
    diluting the precipitate in water so as to obtain a solids content ranging from 15% to 25%,
    correcting the pH of the solution to a value ranging from 7 to 7.5,
    thermally treating said precipitate resuspended in water at a temperature ranging from 75 to 95° C. for from 10 minutes to 1 hour,
    granulating and drying said solution in a spray drying tower, and
    recovering the granulated pea protein composition thus obtained.

13. Textured pea proteins, having:
    a water uptake ranging from 5 to 6 g/g,
    a density ranging from 80 to 90 g/l.

14. The textured pea proteins as claimed in claim 13, having:
    a structure having long and well-oriented fibers, and
    a color index having a value ranging from 75 to 95 in the balance of whites, ranging from 1 to 5 in the balance of reds, and ranging from 10 to 30-in the balance of yellows.

15. The textured pea proteins as claimed in claim 13, having a residual moisture content ranging from 10% to 15%.

16. The textured pea proteins as claimed in claim 14, having a residual moisture content ranging from 10% to 15%.

17. A method for preparing textured pea proteins having:
a water uptake ranging from 5 to 6 g/g, and
a density ranging from 80 to 90 g/l, which comprises:
cooking-extrusion of the pea protein composition of claim 1.

18. The method for composing the textured pea proteins as claimed in claim 17, the cooking-extrusion is carried out by the succession of the following steps:
  adding 0.4% by weight of sodium metasulfite and 2% by weight of gypsum to the granulated pea protein composition,
  introducing the mixture thus obtained with water into a cooking-extruding device having a co-rotating twin-screw configuration,
  carrying out the extrusion at a first-boiler temperature ranging from 80 to 90° C., and a second-boiler temperature ranging from 150 to 190° C., and a screw speed ranging from 450 to 500 rpm, and
  recovering the textured pea proteins at the extruder outlet in the form of a string and leaving to dry at ambient temperature.

19. A method for preparing textured pea proteins having:
a water uptake ranging from 5 to 6 g/g, and
a density ranging from 80 to 90 g/l, which comprises:
adding 0.4% by weight of sodium metasulfite and 2% by weight of gypsum to the granulated pea protein composition of claim 6,
introducing the mixture thus obtained with water into a cooking-extruding device having a co-rotating twin-screw configuration,
carrying out the extrusion at a first-boiler temperature ranging from 80 to 90° C., and a second-boiler temperature ranging from 150 to 190° C., and a screw speed ranging from 450 to 500 rpm, and
recovering the textured pea proteins at the extruder outlet in the form of a string and leaving to dry at ambient temperature.

* * * * *